US007424295B2

(12) United States Patent
Isobe et al.

(10) Patent No.: US 7,424,295 B2
(45) Date of Patent: Sep. 9, 2008

(54) HANDOVER CONTROL APPARATUS, BASE STATION, EDGE ROUTER, RELAY ROUTER, RADIO TERMINAL UNIT, MOBILE COMMUNICATION SYSTEM, AND HANDOVER CONTROL METHOD

(75) Inventors: Shinichi Isobe, Kanagawa (JP); Ken Igarashi, Kanagawa (JP); Atsushi Iwasaki, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/692,126

(22) Filed: Mar. 27, 2007

(65) Prior Publication Data

US 2007/0189221 A1    Aug. 16, 2007

Related U.S. Application Data

(63) Continuation of application No. 10/399,785, filed as application No. PCT/JP02/08581 on Aug. 26, 2002, now abandoned.

(51) Int. Cl.
*H04Q 7/20* (2006.01)

(52) U.S. Cl. .................. 455/436; 455/414.1; 455/415; 455/417; 455/428; 455/432.1; 455/439; 455/442; 455/445; 455/517; 455/560; 370/331

(58) Field of Classification Search .................. 455/436, 455/414.1, 415, 417, 428, 432.1, 439, 442, 455/445, 517, 560; 370/331

See application file for complete search history.

(56) References Cited

U.S. PATENT DOCUMENTS 5,396,647 A    3/1995    Thompson et al.

(Continued)

FOREIGN PATENT DOCUMENTS

EP    0 851 701 A2    7/1998

(Continued)

OTHER PUBLICATIONS

Jun Iwasaki et al.: "Proactive ryoiki settei ni yoru handover seigyo" The Institute of Electronics, Informatio and Communication Engineers Gijutsu Kenkyu Hokoku, NS2001-203, Dec. 11, 2001.

(Continued)

*Primary Examiner*—Quynh H Nguyen
(74) *Attorney, Agent, or Firm*—Oblon, Spivak, McClelland, Maier & Neustadt, P.C.

(57) ABSTRACT

When a radio terminal unit 30 undergoes a handover between base stations 34, 36, a previous edge router 40 having been connected to the radio terminal unit 30, out of edge routers 40, 42 provided in respective base stations 34, 36, provides an instruction to instruct a relay router 48, under which the edge router 40 and every edge router 42 in the base station 36 as a candidate for a destination of the movement are connected, to buffer data from a correspondent node, and instructs the relay router to forward the data buffered in the relay router 48 according to the instruction, to the radio terminal unit 30 after the movement, after completion of the handover, whereby the buffered data is forwarded to the radio terminal unit 30. This implements forwarding packet data through the optimal path to the radio terminal unit after the movement in the handover control and achieves effective utilization of network resources and reduction of handover transactions.

27 Claims, 6 Drawing Sheets

U.S. PATENT DOCUMENTS

| | | | |
|---|---|---|---|
| 6,023,461 | A | 2/2000 | Raychaudhuri et al. |
| 6,519,456 | B2 * | 2/2003 | Antonio et al. ............. 455/442 |
| 2001/0006513 | A1 | 7/2001 | Kim |

FOREIGN PATENT DOCUMENTS

| | | |
|---|---|---|
| EP | 984656 | 3/2000 |
| JP | 3075260 | 6/2000 |
| JP | 3191788 | 5/2001 |
| JP | 2001-268617 | 9/2001 |
| WO | WO 99/27657 | 6/1999 |

OTHER PUBLICATIONS

Shin'ichi Isobe et al.: "Crossover router ni okeru buffering shubo o mochiita lossless—fast HO" 2001 NEN The Institute of Electronics, Information and Communication Engineers Tsushin Society Taikai, B-6-95, Aug. 29, 2001 (with English translation).

Mohamed Khalil et al.: "Buffer management for mobnile IP" Internet-Draft draft-mkhalil-mobileip-buffer-00.txt Oct. 1999.

G. Tsirtsis et al.: "Fast handovers for mobile IPv6" Internet-Draft draft-designteam-fast-mipv6-01.tx Feb. 2001.

Hee Y. Jung et al.: "Fast handoff with chain tunneling for mobile IPv6" Internet-Drat draft-jung-mobileip-fastho-chain-00.txt Jun. 2002.

MIPv4 Handoffs Desing Team: "Low latency handoffs in mobile IPv4" Internet-Draft draft-ietf-mobileip-lowlatency-handoffs-v4-04.txt Jun. 2002.

Govind Krishnamurthi et al.: "Buffer management for smooth handovers in IPv6" Internet-Draft draft-krishnamurthi-mobileip-buffer6-01.tx Mar. 1, 2001.

Dommety, Gopal; Veeraraghavan, Malathi; and Singhal, Mukesh, Route Optimazation in Mobile ATM Networks, Mobile Networks and Applications, vol. 3, No. 2, Aug. 1998, pp. 203-220. XP-002481577.

Dommety, Gopal; Veeraraghavan, Malathi; and Singhal, Mukesh, "Route Optimazation Algorithm and Its Application to Mobile Location Management in ATM Networks", IEEE Journal on Selected Areas in Communications, IEEE Service Center, vol. 16, No. 6, Aug. 1, 1998, XP011054805.

Perkins, Charles E., et al, "Optimized Smooth Handoffs in Mobile IP", Proceedings IEEE International Symposium on Computers and Communications, Jul. 6, 1999, pp. 340-346. XP002902009.

Wong, W. S. V., et al, A Path Optimization Signalling Protocol for Inter-Switch Handoff in Wireless ATM Networks, Computer Networks. Elsevier Science Publishers B.V., Amsterdam, NL, vol. 31, No. 9-10, May 7, 1999. pp. 975-984. XP004304532.

Chai-Keong Toh, Institute of Electrical and Electronics Engineers; "Performance Evaluation of Crossover Switch Discovery Algorithms for Wireless ATM LANs", Proceedings of IEEE INFOCOM 1996. Conference on Computer Communications. Fifteenth Annual Joint Conference of the IEEE Computer and Communications Societies. Networking the Next Generation. San Francisco, Mar 24-28, 1996, vol. 3, Mar. 24-28, 1996, vol. 3, Mar. 24, 1996, pp. 1390-1387. XP010158212.

* cited by examiner

HANDOVER CONTROL APPARATUS, BASE STATION, EDGE ROUTER, RELAY ROUTER, RADIO TERMINAL UNIT, MOBILE COMMUNICATION SYSTEM, AND HANDOVER CONTROL METHOD

CROSS-REFERENCE TO RELATED APPLICATIONS

This application is a Continuation of U.S. patent application Ser. No. 10/399,785 filed Apr. 28, 2003, which was a National Stage Application of PCT Application No. PCT/JP02/08581 filed Aug. 26, 2002, and claims priority to Japanese Patent Application No. P2001-256760, filed Aug. 27, 2001. The contents of U.S. application Ser. No. 10/399,785 are incorporated herein by reference in their entirety.

TECHNICAL FIELD

The present invention relates to a handover control apparatus, a base station, an edge router, a relay router, a radio terminal unit, a mobile communication system, and a handover control method.

BACKGROUND ART

The conventional schemes proposed in IETF (Internet Engineering Task Force) (for example, Govind Krishnamurthi, Robert C. Chalmers, Charles E. Parkins, "Buffer management for smooth handovers in ipv6.," INTERNET DRAFT, March 2001) involve handover control to buffer packet data.

In this handover control, packet data is buffered in an edge router provided in a base station during a handover of a radio terminal unit, in order to implement handover control without loss of packet data. After completion of the handover, the buffered packet data is forwarded to an edge router at a destination.

A configuration of a mobile communication system performing such handover control is presented in FIG. 6 and will be described below.

This mobile communication system shown in FIG. 6 is comprised of a radio terminal unit 10 which is a mobile communication means such as a cellular telephone or the like, a plurality of base stations 12, 14, 16 for radio communication with the radio terminal unit 10, edge routers 18, 20, 22 provided in these base stations 12-16, and CORs (Cross Over Routers) 24, 26, 28 connected to these edge routers 18-22. Here the CORs 24-28 are arranged in a hierarchical structure with COR 28 at the top, in which the edge routers 18, 20 are under COR 24, the edge router 22 under COR 26, and the edge routers 18-22 under COR 28 through CORs 24, 26.

In this configuration, the data buffering point was the previous edge router 20 in the handover control during movement of the radio terminal unit 10 from a covered area of the edge router 20 to a covered area of the edge router 22. In this handover control, all packet data transmitted from an unrepresented correspondent node as a sender during the handover of the radio terminal unit 10 was once forwarded through CORs 28, 24 to the previous edge router 20 connected before the movement, as indicated by an arrow Y1, and buffered therein.

After completion of the handover of the radio terminal unit 10 to the edge router 22, an instruction is then given to instruct the previous edge router 20 to forward the buffered packet data and in accordance with this instruction, as indicated by an arrow Y2, the packet data is forwarded from the edge router 20 through a plurality of CORs 24, 28, 26 to the radio terminal unit 10 connected to the new edge router 22 after the movement. The lossless handover was achieved by the buffering in the previous edge router 20 in this way.

DISCLOSURE OF THE INVENTION

In the conventional handover control method, however, since during the handover the packet data is buffered in the previous edge router 20 having been connected to the radio terminal unit 10, the packet data is forwarded from the edge router 20 connected before the movement, through the CORs 24, 28, 26 to the radio terminal unit 10 connected to the edge router 22 after the movement, as indicated by the arrow Y2, during the period after the handover of the radio terminal unit 10 and before completion of the forwarding the buffered data. Namely, the packet data is forwarded through the redundant path during the handover control and this poses the problem of waste of network resources.

In this handover control, there simultaneously exist two paths for forwarding buffered packet data: the path of code Y2 for forwarding packet data from the edge router 20 to the edge router 22 and the path of code Y3 for transmitting packet data from the correspondent node to the edge router 22, as shown in FIG. 6. Therefore, the packets via the respective paths arrive in a mixed state at the edge router 22, which raises the problem of packet miss-ordering during the handover.

The present invention has been accomplished in view of the above problems and an object of the invention is to provide a handover control apparatus, a base station, an edge router, a relay router, a radio terminal unit, a mobile communication system, and a handover control method capable of implementing forwarding packet data through an optimal path to the radio terminal unit after movement in handover control and thereby achieving effective utilization of network resources and prevention of the packet miss-ordering during the handover.

In order to solve the above problems, a handover control apparatus of the present invention is a handover control apparatus for controlling handover of a radio terminal unit between edge routers provided in respective base stations for radio communication with radio terminal unit, the handover control apparatus comprising: control means for performing such control as to buffer data from a correspondent node in a relay router under which a previous edge router having been connected to the radio terminal unit and every edge router as a candidate for a destination of the movement are connected, during the handover.

In this configuration, the data from the correspondent node is buffered in the relay router, whereby it is feasible to nullify the redundant path in forwarding packet data and thereby achieve the effective utilization of network resources and the prevention of packet miss-ordering during the handover. In the conventional technology, since during the handover the data was buffered in the previous edge router having been connected to the radio terminal unit, the data was forwarded from the edge router connected before the movement, through the redundant path via a plurality of routers to the radio terminal unit after the movement, which resulted in waste of network resources. In addition, there simultaneously existed two paths: the path for forwarding buffered packet data from the previous edge router to the new edge router after movement and the path for forwarding packet data from the correspondent node to the new edge router after movement; therefore, there occurred the packet miss-ordering because of delivery of the packets in a mixed state.

In order to solve the above problems, a base station of the present invention is a base station for detecting handover of a radio terminal unit, the base station comprising: retaining means for retaining location information about locations of an adjacent base station and every relay router connected to the adjacent base station; determining means for determining a relay router under which a base station having been connected to the radio terminal unit and every base station as a candidate for a destination of the movement are connected, based on the location information thus retained; and instructing means for instructing the relay router thus determined to buffer data from a correspondent node.

In this configuration, the appropriate relay router is instructed to buffer the data from the correspondent node, whereby it is feasible to buffer the data to be transmitted to the radio terminal unit under the handover, and thereby prevent data reception loss.

In order to solve the above problems, an edge router of the present invention is an edge router provided in a base station for detecting handover of a radio terminal unit and connected by radio communication to the radio terminal unit, the edge router comprising: retaining means for retaining location information about locations of an adjacent edge router and every relay router connected to the adjacent edge router; determining means for determining a relay router under which a previous edge router having been connected to the radio terminal unit and every edge router as a candidate for a destination of the movement are connected, based on the location information thus retained; and instructing means for instructing the relay router thus determined to buffer data from a correspondent node.

In this configuration, the data from the correspondent node is buffered in the relay router, whereby it is feasible to nullify the redundant path in forwarding packet data and thereby achieve the effective utilization of network resources and the prevention of packet miss-ordering during the handover. In the conventional technology, since during the handover the data was buffered in the previous edge router having been connected to the radio terminal unit, the data was forwarded from the edge router connected before the movement, through the redundant path via a plurality of routers to the radio terminal unit after the movement, which resulted in waste of network resources. In addition, there simultaneously existed two paths: the path for forwarding buffered packet data from the previous edge router to the new edge router after movement and the path for forwarding packet data from the correspondent node to the new edge router after movement; therefore, there occurred the packet miss-ordering because of delivery of the packets in a mixed state.

In order to solve the above problems, a relay router of the present invention is configured to buffer data from a correspondent node in accordance with an instruction to buffer data, given by the instructing means of the above base station or the above edge router, change a forwarding address of a packet to an address of a destination of the radio terminal unit in accordance with a data forwarding instruction from the radio terminal unit after the handover, put the data with an identifier for identification of the packet, and forward the packet to the current address of the radio terminal unit.

In this configuration, the data to be transmitted to the radio terminal unit is buffered during the handover of the radio terminal unit and the buffered data can be properly forwarded after the movement of the radio terminal unit. In this configuration, the identifier is generated in the relay router, and the packet data transmitted from the correspondent node as a sender is kept unchanged without being rewritten, whereby the packet data can be transmitted to the radio communication terminal unit after the movement, without being involved in the problem of security.

In order to solve the above problems, a radio terminal unit of the present invention is a radio terminal unit configured to implement radio communication with each base station and, during handover between edge routers provided in respective base stations, perform control of the handover, the radio terminal unit comprising: control means for performing such control as to make a relay router under which a previous edge router having been connected to the radio terminal unit and every edge router as a candidate for a destination of the movement are connected, buffer data from a correspondent node during the handover.

In this configuration, the data from the correspondent node is buffered in the relay router, whereby it is feasible to nullify the redundant path in forwarding packet data and thereby achieve the effective utilization of network resources and the prevention of packet miss-ordering during the handover. In the conventional technology, since during the handover the data was buffered in the previous edge router having been connected to the radio terminal unit, the data was forwarded from the edge router connected before the movement, through the redundant path via a plurality of routers to the radio terminal unit after the movement, which resulted in waste of network resources. In addition, there simultaneously existed two paths: the path for forwarding buffered packet data from the previous edge router to the new edge router after movement and the path for forwarding packet data from the correspondent node to the new edge router after movement; therefore, there occurred the packet miss-ordering because of delivery of the packets in a mixed state.

In order to solve the above problems, a mobile communication system of the present invention is a mobile communication system for implementing handover of a radio terminal unit between base stations, the mobile communication system comprising: relay routers connected above the base stations in a hierarchical structure and configured to perform relaying of data to the base stations and buffering of data; and edge routers provided in the respective base stations, each edge router being configured to provide an instruction to instruct a relay router under which a base station having been connected to the radio terminal unit and every base station as a candidate for a destination of the movement are connected, to buffer data from a correspondent node during the handover, and instruct the relay router to forward the data buffered in the relay router according to the instruction to the radio terminal unit after the movement.

In this configuration, the data from the correspondent node is buffered in the relay router, whereby it is feasible to nullify the redundant path in forwarding packet data and thereby achieve the effective utilization of network resources and the prevention of packet miss-ordering during the handover. In the conventional technology, since during the handover the data was buffered in the previous edge router having been connected to the radio terminal unit, the data was forwarded from the edge router connected before the movement, through the redundant path via a plurality of routers to the radio terminal unit after the movement, which resulted in waste of network resources. In addition, there simultaneously existed two paths: the path for forwarding buffered packet data from the previous edge router to the new edge router after movement and the path for forwarding packet data from the correspondent node to the edge router after movement; therefore, there occurred the packet miss-ordering because of delivery of the packets in a mixed state.

In order to solve the above problems, a handover control method according to the present invention is a handover control method of controlling handover of a radio terminal unit between edge routers provided in respective base stations for radio communication with radio terminal unit, the handover control method comprising: a control step of performing such control as to buffer data from a correspondent node in a relay router under which a previous edge router having been connected to the radio terminal unit and every edge router as a candidate for a destination of the movement are connected, in accordance with an instruction to buffer the data from the correspondent node.

In this configuration, the data from the correspondent node is buffered in the relay router, whereby it is feasible to nullify the redundant path in forwarding packet data and thereby achieve the effective utilization of network resources and the prevention of packet miss-ordering during the handover. In the conventional technology, since during the handover the data was buffered in the previous edge router having been connected to the radio terminal unit, the data was forwarded from the edge router connected before the movement, through the redundant path via a plurality of routers to the radio terminal unit after the movement, which resulted in waste of network resources. In addition, there simultaneously existed two paths: the path for forwarding buffered packet data from the previous edge router to the new edge router after movement and the path for forwarding packet data from the correspondent node to the edge router after movement; therefore, there occurred the packet miss-ordering because of delivery of the packets in a mixed state.

BEST MODE FOR CARRYING OUT THE INVENTION

Embodiments of the Invention

An embodiment of the present invention will be described below in detail with reference to the drawings.

Figure 1:
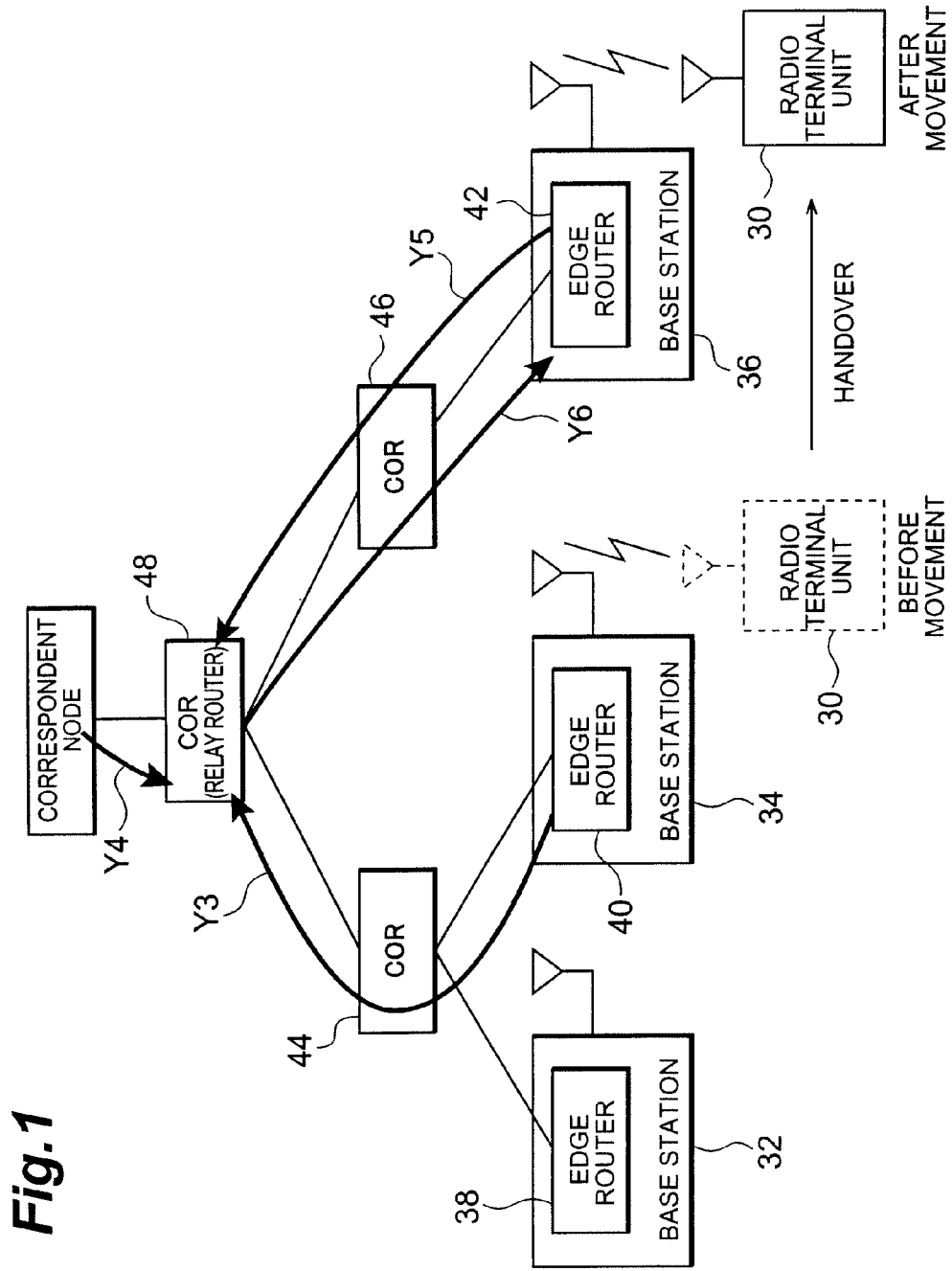
FIG. 1 is a block diagram showing a configuration of a mobile communication system according to an embodiment.

FIG. 1 is a block diagram showing a configuration of a mobile communication system according to an embodiment of the present invention.

This mobile communication system shown in FIG. 1 is comprised of a radio terminal unit 30 which is a mobile communication means such as a cellular phone or the like, a plurality of base stations 32, 34, 36 for radio communication with the radio terminal unit 30, edge routers 38, 40, 42 provided in the respective base stations 32-36, and CORs 44, 46, 48 connected to these edge routers 38-42.

Here the CORs 44-48 are arranged in a hierarchical structure with COR 48 at the top, in which the edge routers 38, 40 are under COR 44, the edge router 42 under COR 46, and the edge routers 38-42 under COR 48 through the CORs 44, 46. The edge routers 38, 40, 42 retain information about adjacent edge routers to which the radio terminal unit 30 is expected to move next. For example, the edge router 40 retains information about the adjacent edge routers 38, 42 as the information about the adjacent edge routers to which the radio terminal unit 30 is expected to move next.

The mobile communication system is constructed such as Regional Registrations, Hierarchical Mobile IP proposed in IETF.

In this configuration, the handover control in movement of the radio terminal unit 30 from a covered area of the edge router 40 to a covered area of the edge router 42 is initiated according to the radio wave condition of wireless links by the radio terminal unit 30 or by the edge router 40 to which the radio terminal unit 30 is connected at present. At this time, the radio terminal unit 30 or the edge router 40 determines the COR 48 as a relay router out of a plurality of CORs 44-48 on the basis of the information about the adjacent edge routers registered in the edge router 40.

Figure 2:
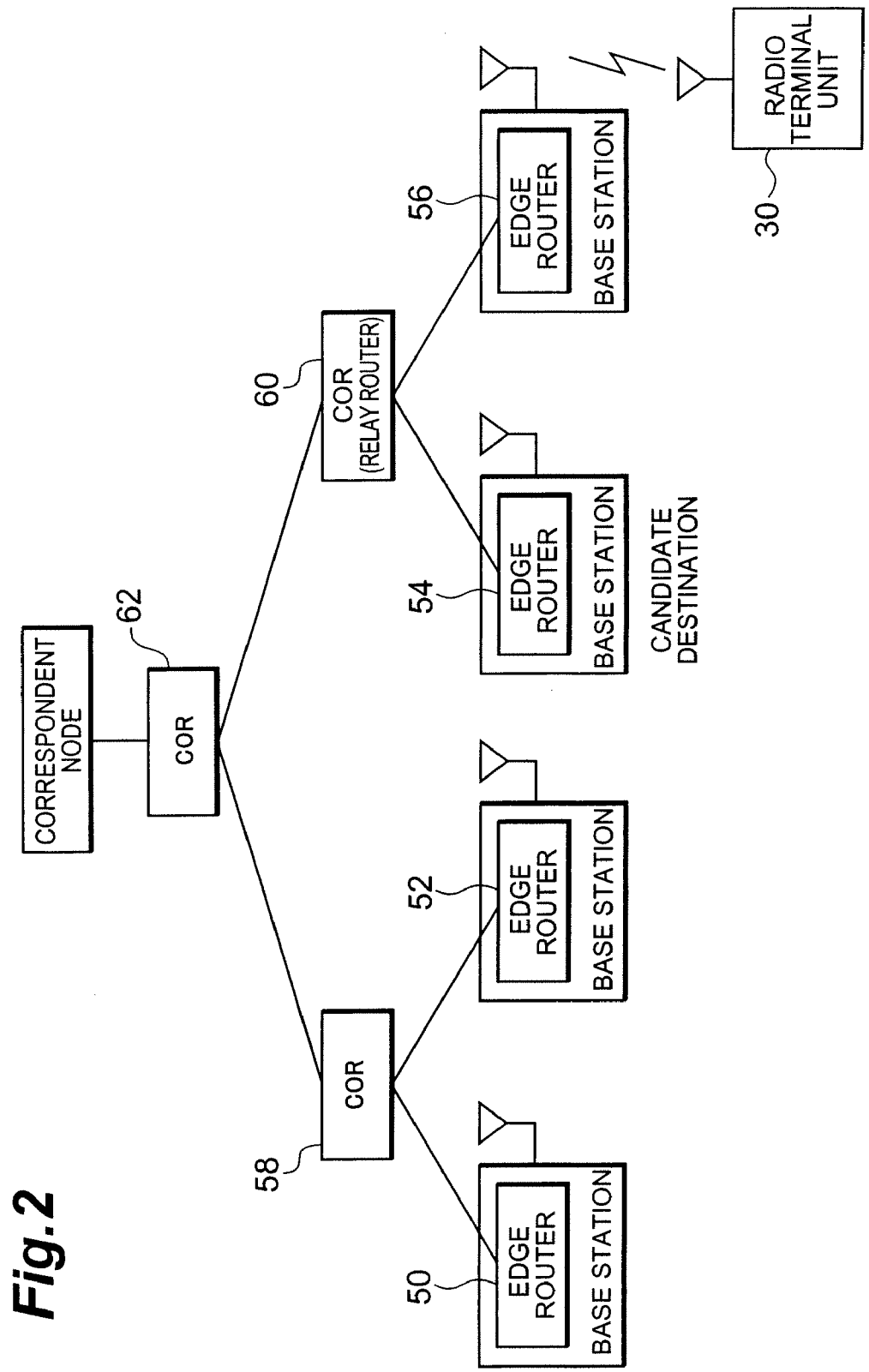
FIG. 2 is a first block diagram for explaining a method of determining a relay router in a mobile communication system according to an embodiment.

The way of determining the relay router will be described with reference to FIGS. 2 and 3. First, as shown in FIG. 2, let us suppose a situation in which the radio terminal unit 30 is, for example, in connection with edge router 56 in a configuration where COR 58 is connected to each of edge routers 50, 52 provided in their respective base stations, COR 60 is further connected to each of edge routers 54, 56, and COR 62 is connected above those CORs 58, 60 thereto.

On this occasion, if only one edge router 54 is recognized as an edge router being a candidate for a destination of movement of the radio terminal unit 30 from the adjacent edge router information retained in the edge router 56, the COR 60, which is connected above to both of the edge router 56 in a currently connected state and the edge router 54 as a candidate destination (or under which the edge router 56 in the currently connected state and the edge router 54 as a candidate destination both are connected), is determined as a relay router. Namely, the COR 60, which can transmit packet data from the correspondent node to both the edge router 56 in the currently connected state and the edge router 54 as a candidate destination and which has the minimum hop count from the radio terminal unit 30, is determined as a relay router. The hop count represents the distance (not physical distance) from the radio terminal unit to the relay router to buffer the data.

Figure 3:
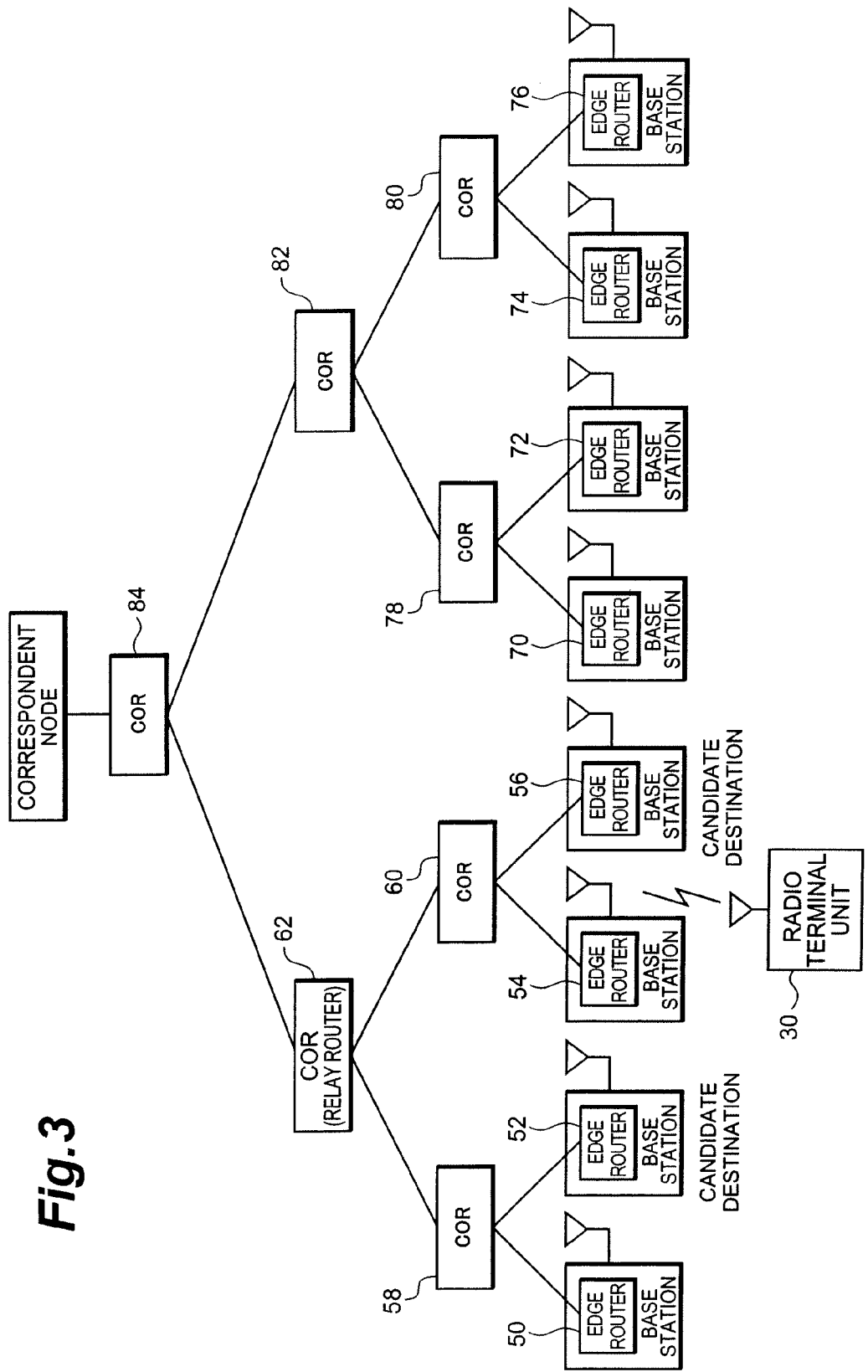
FIG. 3 is a second block diagram for explaining a method of determining a relay router in a mobile communication system according to an embodiment.

As shown in FIG. 3, let us suppose another situation in which the radio terminal unit 30 is, for example, in connection with edge router 54 in a configuration where COR 58 is connected to each of edge routers 50, 52 provided in their respective base stations, COR 60 is further connected to each of edge routers 54, 56, COR 62 is connected above to those CORs 58, 60, COR 78 is further connected to each of edge routers 70, 72, COR 80 is further connected to each of edge routers 74, 76, COR 82 is connected above to those CORs 78, 80, and COR 84 is connected above to CORs 62, 82.

Let us suppose that on this occasion two edge routers 52, 56 are recognized as edge routers being candidates for the destination of movement of the radio terminal unit 30 from the adjacent edge router information retained in the edge router 54. In this case, the COR 62, which is connected above to both of the COR 60 connected above to the edge router 54 in a currently connected state and the edge router 56 as a candidate destination and the COR 58 connected above to the edge router 52 as another candidate destination, is determined as a relay router.

Namely, the COR 62, which can transmit the packet data from the correspondent node to the edge router 54 in the currently connected state and to all the edge routers 56, 52 as candidate destinations and which has the minimum hop count from the radio terminal unit 30, is determined as a relay router.

The radio terminal unit 30 or the edge router 40 in the currently connected state to the radio terminal unit 30 sends a buffering instruction message to the COR (relay router) 48 shown in FIG. 1 and determined as described above, as indicated by an arrow Y3. The COR 48, receiving this message, buffers packet data transmitted thereafter as indicated by an arrow Y4 from the correspondent node, as a relay router. Thereafter, the radio terminal unit 30 undergoes a handover to one edge router 42 out of the edge routers 38, 42 of candidate destinations.

The radio terminal unit 30 after the handover to the new edge router 42 acquires an address used in the edge router 42 and sends a location registration message for location registration of the new address through the COR (relay router) 48 to the unrepresented home network and the correspondent node as indicated by an arrow Y5.

For performing this transmission, there are two conceivable methods in the present invention: a method of separately sending a location registration message and a forwarding instruction message; and a method of sending one message containing the both. When the forwarding instruction message passes the COR (relay router) 48, the COR (relay router) 48, receiving the forwarding instruction message, capsulates the buffered packet data on the basis of the current address of the radio terminal unit 30 and forwards the capsulated data through the edge router 42 to the radio terminal unit 30, as indicated by an arrow Y6. After completion of the location registration, packet data thereafter transmitted from the source correspondent node to the radio terminal unit 30 is transmitted to the address of the destination, thereby terminating the buffering in the COR (relay router) 48.

The operation of forwarding the packet data buffered in the COR (relay router) 48 will be described below with reference to FIG. 4. The radio terminal unit 30 with the address A for identification of the radio terminal unit in the relay router sends the buffering instruction message to instruct the COR (relay router) 48 to buffer the packet data addressed to the address A before a handover. According to this instruction, the COR (relay router) 48 buffers packet data addressed to the address A from the correspondent node as indicated by code 90.

Furthermore, when the radio terminal unit 30 is assigned an address B after the handover, it sends to the correspondent node a message for location registration of the address B (location registration message) and a message for instruction of forwarding packet data addressed to the address A (forwarding instruction message). These messages can also be sent in the form of one message.

The COR (relay router) 48, receiving those messages, capsulates the packet data to the address A having been buffered there, while assigning the data the destination address B, as indicated by code 91, and then transmits it to the address B. The radio terminal unit 30, receiving the packet data 91 addressed to B, decapsulates the packet data as indicated by code 92. Since the destination address of the decapsulated packet data 92 at this time is A, the radio terminal unit 30 cannot receive the packet data 92 under normal circumstances. However, the radio terminal unit 30 is configured to memorize the address A before the movement in the present invention, so that it can also receive the packet data 92 addressed to the address A, whereby the radio terminal unit can receive the packet data to the address A having been buffered in the COR (relay router) 48 during the handover.

In the mobile communication system of the embodiment, as described above, on the occasion of the handover of the radio terminal unit 30 between base stations 34, 36, the previous edge router 40 having been connected to the radio terminal unit 30, out of the edge routers 40, 42 provided in the respective base stations 34, 36, instructs the relay router 48, under which the edge router 40 and every edge router 42 of the base station 36 as a candidate destination are connected, to buffer the packet data from the correspondent node, and instructs the relay router 48 to forward the packet data buffered in the relay router 48 on the basis of the instruction, to the radio terminal unit 30 after the movement after the handover, and then the buffered packet data is forwarded to the radio terminal unit 30.

This permits the packet data from the correspondent node to be buffered in the relay router 48 during the handover, whereby it is feasible to nullify the redundant path during forwarding the packet data and thereby achieve the effective utilization of network resources. In addition, there occurs no packet miss-ordering during the handover. In the conventional technology, since during the handover the data was buffered in the previous edge router having been connected to the radio terminal unit, the data was forwarded from the edge router before the movement through the redundant path via a plurality of routers to the radio terminal unit after the movement, which resulted in waste of network resources. In addition, there simultaneously existed two paths: the path for forwarding buffered packet data from the edge router before the movement to the edge router after the movement and the path for forwarding packet data from the correspondent node to the edge router after the movement; therefore, there occurred the packet miss-ordering because of delivery of the packets in a mixed state.

Applied to the relay router 48 to buffer the packet data from the correspondent node is the relay router that has the minimum hop count from the radio terminal unit 30 among the relay routers under which all the candidate base stations as potential destinations are connected, out of the plurality of relay routers 44-48 connected in the hierarchical structure. This results in buffering the packet data from the correspondent node in the relay router 48 that is the relay router under which the base station having been connected to the radio terminal unit 30 and every base station as a candidate destination are connected, and that has the minimum hop count from the radio terminal unit, so that the packet data can be forwarded through the shortest path to the radio terminal unit 30 after the movement, whereby it is feasible to achieve more effective utilization of network resources.

In the present embodiment, each edge router retains the location information about locations of adjacent edge routers and the relay routers connected to the adjacent edge routers, the relay router under which the previous edge router having being connected to the radio terminal unit 30 under a handover and every edge router as a candidate destination are connected is determined based on the retained location information, and the relay router thus determined is instructed to buffer the packet data from the correspondent node. This results in instructing the appropriate relay router to buffer the packet data from the correspondent node, at the time of detecting a handover in the base station, whereby the packet data to be transmitted to the radio terminal unit under the handover can be buffered well without occurrence of packet data reception loss.

For determining the relay router, the present embodiment is provided with the function of determining the relay router with the minimum hop count from the radio terminal unit 30 among the relay routers under which all the candidate base stations as potential destinations are connected, out of the plurality of relay routers connected in the hierarchical structure. This enables the relay router closest to the radio terminal unit 30 after the movement to be instructed to buffer the packet data from the correspondent node.

The present embodiment is also provided with the function of instructing the relay router buffering the packet data to forward the buffered packet data to the radio terminal unit 30, after the movement by the handover of the radio terminal unit 30. This enables the instruction to forward the packet data from the correspondent node having been buffered in the relay router with the minimum hop count from the radio terminal unit, which is the relay router under which the base station having been connected before the movement to the radio terminal unit 30 and every base station as a candidate destination are connected.

The above relay router has the function of buffering the packet data from the correspondent node in accordance with the packet data buffering instruction from the edge router, capsulating the buffered packet data with the destination address of the radio terminal unit 30 in accordance with the packet data forwarding instruction from the edge router, providing it the packet identifier, and forwarding the capsulated data to the destination address. This permits the relay router to buffer the packet data to be transmitted to the radio terminal unit 30, and to properly forward the buffered packet data to the radio terminal unit 30 after the movement.

The radio terminal unit 30 memorizes the address for identification of the radio terminal unit in the relay router during the handover, receives the capsulated data forwarded from the relay router, and, if in this received packet data there exists the same address as the memorized address, acquires the packet data provided with the same address. This permits the radio terminal unit to recognize the address before the movement in the capsulated data even if the radio terminal unit 30 is provided with a new address after the movement, and the radio terminal unit can acquire the packet data provided with the address thus recognized. Namely, the radio terminal unit can properly acquire the packet data having been transmitted to the radio terminal unit itself before the movement, even after the movement involving change of the address.

In addition to the above description, the edge router or the radio terminal unit generates the buffering instruction message to the relay router when there occurs a change of the relay router, when the radio terminal unit needs to change the buffer volume of the relay router, or when an expiration date of the buffer becomes close. It is, however, also contemplated to employ a method of notifying all the radio terminal units of the default buffer value along with RA (Router Advertisement), instead of letting each radio terminal unit perform the message exchange with the relay router, when consideration is given to large-scale networks. The buffering instruction message is resent at predetermined intervals before reception of a response upon actual reception of packet data {BA (Buffer Acknowledgement)}.

After sending of the BA, all the packet data to be forwarded to the radio terminal unit is copied and buffered in the buffer in the relay router. Thereafter, the radio terminal unit notifies the relay router of information to clear already-received packet data {BC (Buffer Clear)}, thereby deleting the data up to the packet data thus notified of, from the buffer.

If the buffer prepared before reception of BC becomes full in the relay router, the packet data is deleted in chronological order from the oldest. The timing of sending of BC is determined for the purpose of updating the expiration date before the expiration date of the assigned buffer and for the purpose of preventing the assigned buffer area from becoming full.

In the present invention, the above method is implemented as described later by inserting a sequence number or a timestamp in the header outside each capsulated data transmitted from the relay router to the radio terminal unit.

The capsulation technology is used for the forwarding data between the relay router and the radio terminal unit as described previously, and, because the header used for the capsulation is generated in the relay router, it can be freely configured without need for consideration to the problem of security as can occur upon rewriting of packet data transmitted from the correspondent node as a sender. For this reason, an option header indicating a sequence number or a timestamp of arriving packet data is introduced into the header of capsulated data. Filled in this option is a sequence number in which each packet addressed to the same radio terminal unit has arrived at the relay router. Since this value can possibly increase without a limit, the modulo of a maximum value that the prepared field can take, and it is reused at intervals of a certain period.

It is also noted that similar options are essential in the buffering instruction message and the forwarding instruction message which are messages requesting an acknowledgment. Then an identifier of a message having served as a trigger of an acknowledgment message is also clearly marked in each response, in order to clearly demonstrate to which message the response is made.

The maximum sequence number or timestamp of the packets received before the handover is marked in the aforementioned forwarding instruction message sent after the handover. The relay router, receiving the forwarding instruction message, deletes the packet data up to the packet data marked in the forwarding instruction message and forwards the packet data thereafter to the radio terminal unit. All the foregoing messages can be sent together with the data packets or signaling packets used in Mobile IP.

Concerning the sequence numbers, it is necessary to manage the sequence numbers on a flow-by-flow basis. However, use of timestamps requires no flow-by-flow management and thus is effective in large-scale networks and others, as compared with the case using the sequence numbers.

As described above, the relay router has the function of providing the identifier of data on the occasion of forwarding the buffered data to the radio terminal unit in accordance with the forwarding instruction from the edge router, the base station, or the radio terminal unit. This permits the relay router to generate the identifier and thus makes it feasible to freely configure the identifier without consideration to the problem of security as can occur upon rewriting of packet data sent from the correspondent node as a sender.

The radio terminal unit has the function of negotiating the buffer size of data from the correspondent node with the relay router. More specifically, the radio terminal unit transmits information about how much volume should desirably be allocated as the buffer size of data from the correspondent node, to the relay router. This permits the relay router to allocate only the necessary buffer size and thus makes it feasible to perform efficient data buffering.

The radio terminal unit also has the function of notifying the relay router of information about already-received data at the radio terminal unit itself, before excess over the buffer size determined by the above negotiation in the relay router. This permits the relay router to know which data has been received by the radio terminal unit at the forwarding address of buffered data during the buffering of data from the correspondent node.

The relay router also has the function of deleting data in chronological order from the oldest on the occasion of performing the data buffering over the date buffer size determined by the negotiation. This permits the relay router to buffer data in order from the newest if the buffered data exceeds the buffer size during the buffering of data from the correspondent node.

The relay router also has the function of deleting already-received data notified of by the radio terminal unit. This permits the relay router to delete data already received by the radio terminal unit, on the occasion of buffering the data from the correspondent node, whereby it is feasible to implement efficient data buffering.

The radio terminal unit has the function of notifying the relay router of the information about already-received data before the handover, after the handover. This permits the relay router to know which data has been received before the handover by the radio terminal unit at the forwarding address.

The relay router also has the function of deleting the already-received data before the handover notified of by the radio terminal unit and forwarding data other than it to the radio terminal unit. This permits the relay router to delete the data already received before the handover by the radio terminal unit out of the buffered data and to forward the data other than it to the radio terminal unit, and thus makes it feasible to forward only necessary data, thereby implementing efficient data forwarding and avoiding duplicate reception of data.

The above embodiment was configured to determine the relay router under which the previous edge router having been connected to the radio terminal unit 30 under the handover and every edge router as a candidate destination are connected, based on the location information retained in the edge router, upon detection of the handover, and to instruct the relay router thus determined to buffer the packet data from the correspondent node (buffering instruction), but it is also possible to modify the configuration so as to perform the determination of the relay router and the buffering instruction, prior to the detection of the handover (i.e., regardless of the detection of the handover). In this case, the data transmitted to the radio terminal unit 30 before execution of the handover is buffered in the relay router and transmitted through the previous edge router to the radio terminal unit 30. In this case, the relay router transmits the data with an identifier through the previous edge router to the radio terminal unit 30.

Figure 4:
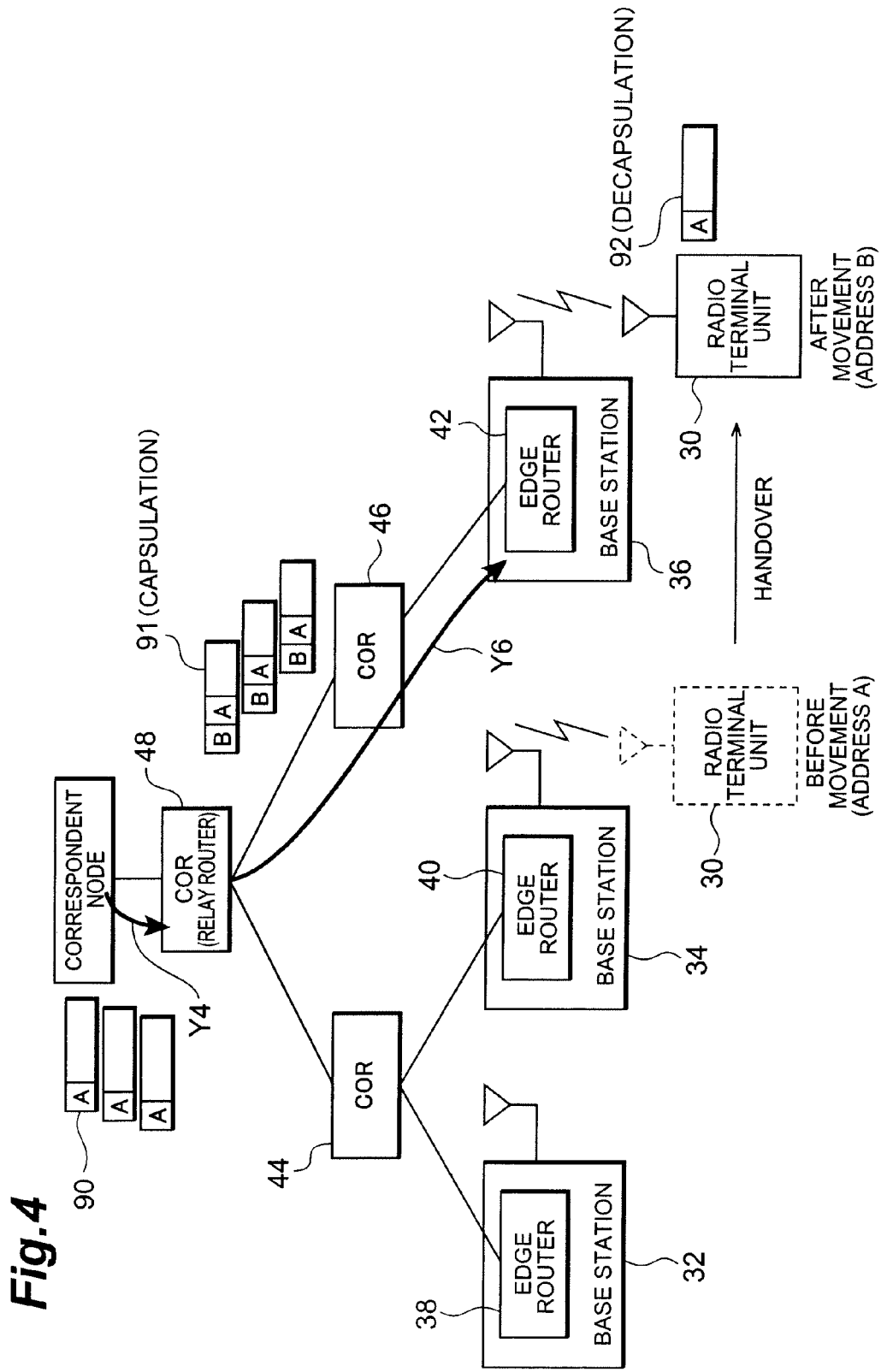
FIG. 4 is a block diagram for explaining the operation of forwarding packet data buffered in a relay router in a mobile communication system according to an embodiment.
Figure 5:
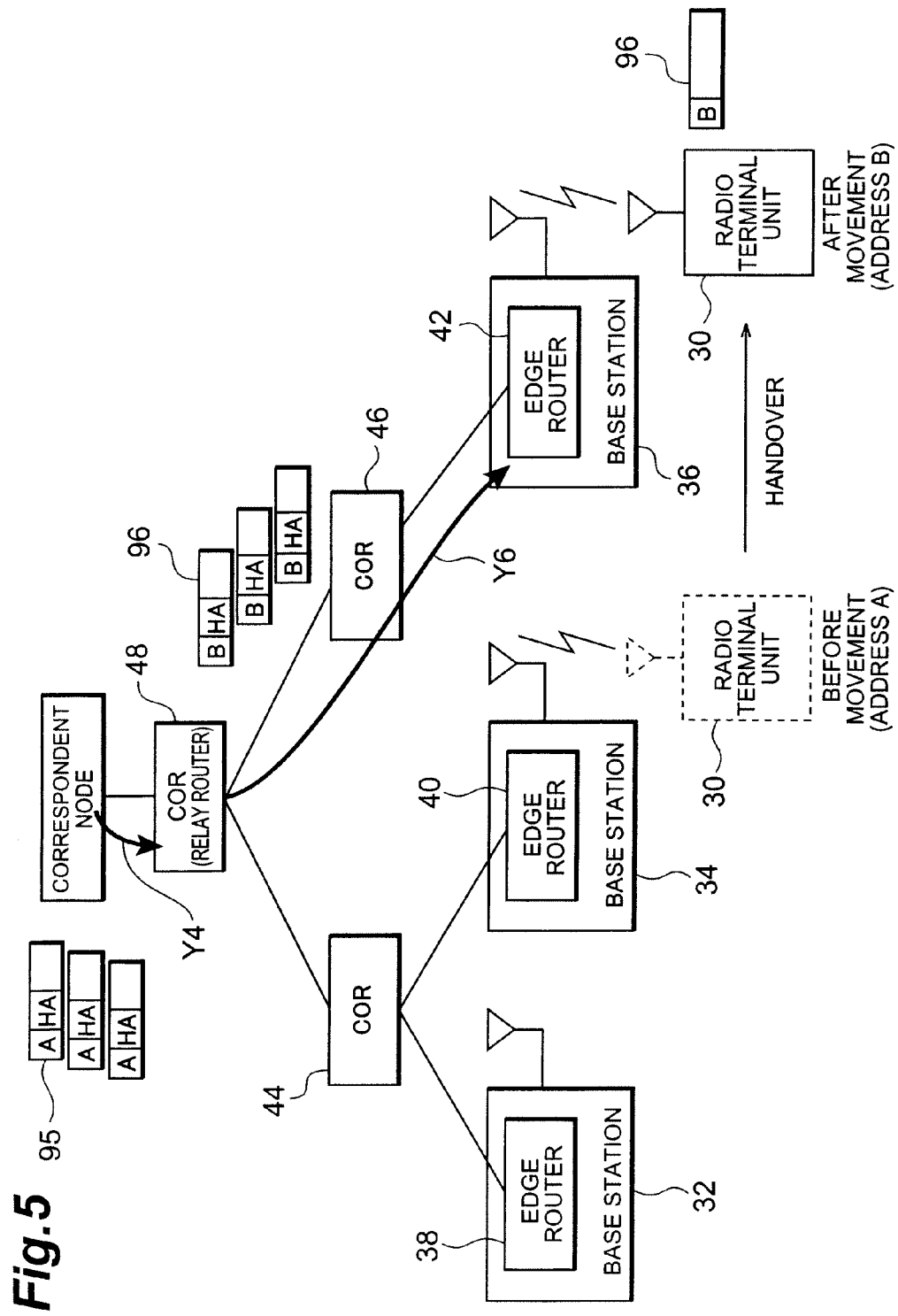
FIG. 5 is a block diagram for explaining the operation of forwarding packet data buffered in a relay router in a mobile communication system according to an embodiment.
Figure 6:
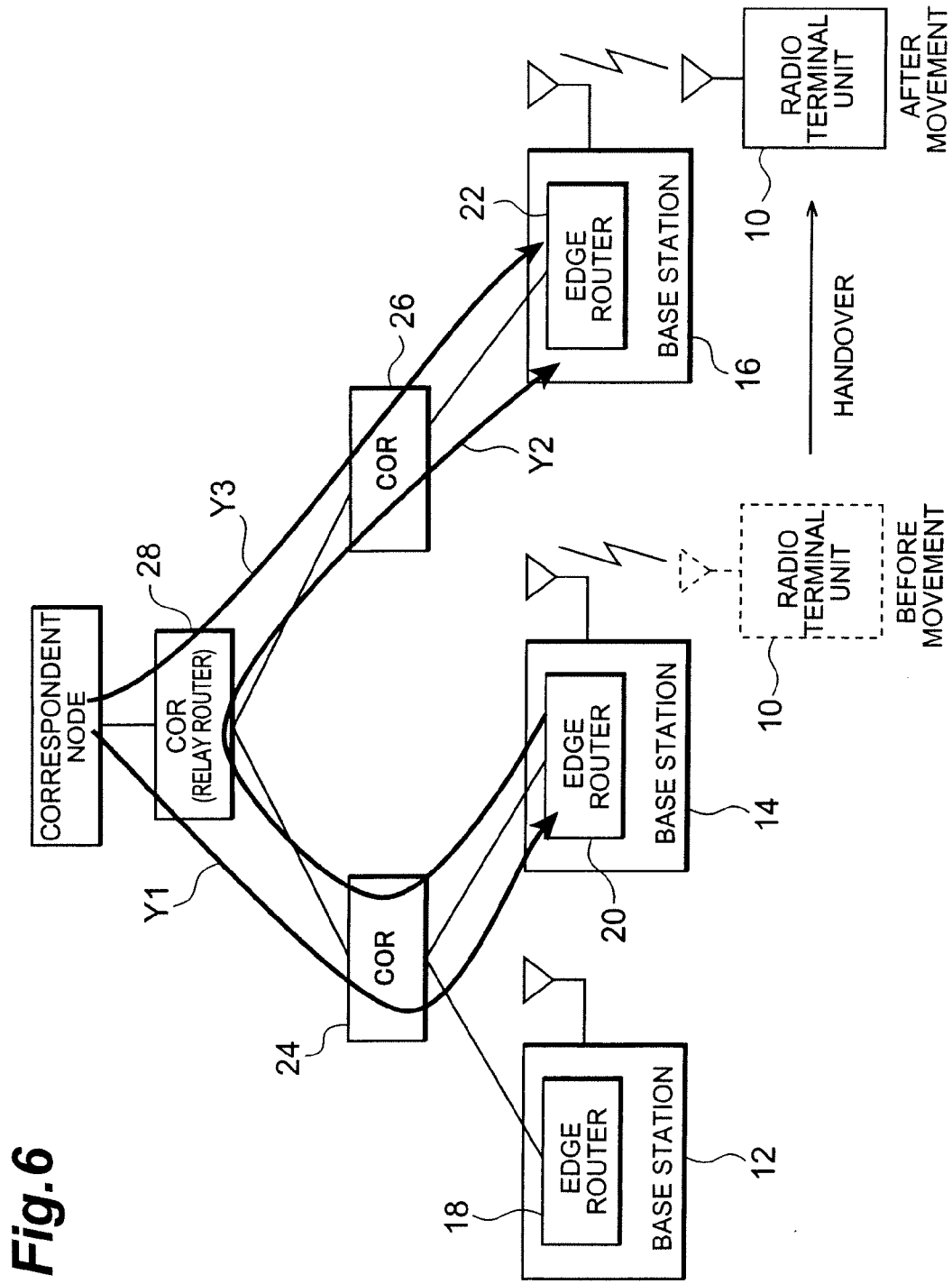
FIG. 6 is a block diagram showing the configuration of the conventional mobile communication system.

In the above embodiment, as described with FIG. 4, the relay router capsulated the buffered packet data addressed to the address A, with the destination address B being added thereto and transmitted the capsulated data to the address B, and the radio terminal unit 30 received and decapsulated the packet data 91 addressed to B. However, this may also be modified, as shown in FIG. 5, so that the relay router, receiving the packet data 95 to the address A containing the address HA set at the time of registration of the radio terminal unit 30, rewrites the packet data into the packet data addressed to the address B, using the address HA as a key, and transmits it to the radio terminal unit 30 after the movement.

INDUSTRIAL APPLICABILITY

The present invention is applicable to mobile communication systems and, particularly, to the handover control apparatus, base stations, edge routers, relay routers, radio terminal units, and handover control methods used in the mobile communication systems.

The invention claimed is:

1. A handover control apparatus configured to control handover of a radio terminal unit between edge routers provided in respective base stations for radio communication with the radio terminal unit, said handover control apparatus comprising:
   a control unit configured to perform such control as to buffer data from a correspondent node in a relay router, under which a previous edge router having been connected to the radio terminal unit and every edge router as a candidate for a destination of the movement are connected, during the handover,
   wherein the relay router, in which the data from the correspondent node is buffered in response to the control unit, is one of a plurality of relay routers connected in a hierarchical structure and is determined by the previous edge router as a relay router with a minimum hop count from the radio terminal unit and under which a plurality of candidate base stations as potential destinations are connected.

2. The handover control apparatus according to claim 1, wherein the control unit is configured to instruct the relay router to forward the data buffered in the relay router, a destination address of the radio terminal unit and an identifier for identification of packet data said destination address.

3. A base station configured to detect handover of a radio terminal unit, said base station comprising:
   a retaining unit configured to retain location information about locations of an adjacent base station and a plurality of relay routers connected to the adjacent base station in a hierarchal structure;
   a determining unit configured to determine a relay router under which a base station having been connected to the radio terminal unit and every base station as a candidate for a destination of the movement are connected, based on the location information thus retained; and
   an instructing unit configured to instruct the relay router thus determined to buffer data from a correspondent node,
   wherein the determining unit is configured to determine the relay router, in which the data from the correspondent node is buffered, by determining a relay router with a minimum hop count from the radio terminal unit and under which a plurality of candidate base stations as potential destinations are connected.

4. The base station according to claim 3, wherein, after movement by handover of the radio terminal unit, said instructing unit is configured to instruct the relay router determined by the determining unit to forward the buffered data to the radio terminal unit.

5. An edge router provided in a base station configured to detect handover of a radio terminal unit and connected by radio communication to the radio terminal unit, said edge router comprising:
   a retaining unit configured to retain location information about locations of an adjacent edge router and a plurality of relay routers connected to the adjacent edge router in a hierarchal structure;
   a determining unit configured to determine a relay router under which a previous edge router having been connected to the radio terminal unit and every edge router as a candidate for a destination of the movement are connected, based on the location information thus retained; and
   an instructing unit configured to instruct the relay router thus determined to buffer data from a correspondent node,
   wherein the determining unit is configured to determine the relay router, in which the data from the correspondent node is buffered, by determining a relay router with a minimum hop count from the radio terminal unit and under which a plurality of candidate base stations as potential destinations are connected.

6. The edge router according to claim 5, wherein, after movement by handover of the radio terminal unit, said instructing unit is configured to instruct the relay router determined by the determining unit to forward the buffered data to the radio terminal unit.

7. A system comprising:
a base station including
a retaining unit configured to retain location information about locations of an adjacent base station and a plurality of relay routers connected to the adjacent base station in a hierarchal structure,
a determining unit configured to determine a relay router under which a base station having been connected to the radio terminal unit and every base station as a candidate for a destination of the movement are connected, based on the location information thus retained, and
an instructing unit configured to instruct the relay router thus determined to buffer data from a correspondent node; and
a relay router configured to buffer data from a correspondent node in accordance with an instruction to buffer data, given by the instructing unit of the base station in accordance with a data forwarding instruction given by the instructing unit, buffer the data from the correspondent node, put with the buffered data a current address of the radio terminal unit and an identifier for identification of packet data, and forward the packet data to the current address of the radio terminal unit after the movement of the radio terminal unit and in accordance with the data forwarding instruction.

8. A radio terminal unit configured to implement radio communication with each base station and, during handover between edge routers provided in respective base stations, perform control of the handover, the radio terminal unit comprising:
a control unit configured to perform such control as to make a relay router under which a previous edge router having been connected to the radio terminal unit and every edge router as a candidate for a destination of the movement are connected, buffer data from a correspondent node during the handover,
wherein the relay router, in which the data from the correspondent node is buffered in response to the control unit, is one of a plurality of relay routers connected in a hierarchical structure and is determined by the previous edge router as a relay router with a minimum hop count from the radio terminal unit and under which a plurality of candidate edge routers as potential destinations are connected.

9. The radio terminal unit according to claim 8, wherein the control unit is configured to instruct the relay router to forward the data buffered in the relay router, a destination address of the radio terminal unit and an identifier for identification of packet data to said destination address.

10. A mobile communication system configured to implement handover of a radio terminal unit between base stations, said mobile communication system comprising:
relay routers connected above the base stations in a hierarchical structure and configured to perform relaying of data to the base stations and buffering of data; and
edge routers provided in the respective base stations, each edge router being configured to provide an instruction to instruct a relay router under which a base station having been connected to the radio terminal unit and every base station as a candidate for a destination of the movement are connected, to buffer data from a correspondent node during the handover, and instruct the relay router to forward the data buffered in the relay router in accordance with the instruction to the radio terminal unit after the movement,
wherein the relay router, in which the data from the correspondent node is buffered, is determined by a previous edge router as a relay router with a minimum hop count from the radio terminal unit and under which a plurality of candidate base stations as potential destinations are connected.

11. The mobile communication system according to claim 10, wherein the relay router is configured to buffer packet data therein in accordance with the instruction to buffer packet data from the edge router, forward the packet data with an identifier of data to the radio terminal unit, and forward the packet data to a current address of the radio terminal unit in accordance with a packet data forwarding instruction of the radio terminal unit after the handover.

12. The mobile communication system according to claim 10, wherein the radio terminal unit is configured to negotiate a buffer size of data from the correspondent node with the relay router.

13. The mobile communication system according to claim 12, wherein the radio terminal unit is configured to notify the relay router of information about already-received data in the radio terminal unit itself, before excess over the buffer size determined by the negotiation with the relay router.

14. The mobile communication system according to claim 12, wherein the relay router is configured to delete the data in chronological order from the oldest during an operation of buffering data over the buffer size determined by the negotiation.

15. The mobile communication system according to claim 13, wherein the relay router is configured to delete the already-received data notified of by the radio terminal unit and update an expiration date of a buffer area allocated for the radio terminal unit.

16. The mobile communication system according to claim 13, wherein the relay router is configured to delete a buffer area whose expiration date has passed.

17. The mobile communication system according to claim 11, wherein after the handover, the radio terminal unit is configured to notify the relay router of information about data having already been received before the handover.

18. The mobile communication system according to claim 17, wherein the relay router is configured to delete the already-received data having already been received before the handover, notified of by the radio terminal unit, and forward data except said already-received data to the radio terminal unit.

19. A handover control method of controlling handover of a radio terminal unit between edge routers provided in respective base stations for radio communication with the radio terminal unit, said handover control method comprising:
performing control as to buffer data from a correspondent node in a relay router under which a previous edge router having been connected to the radio terminal unit and every edge router as a candidate for a destination of the movement are connected, in accordance with an instruction to buffer the data from the correspondent node,
wherein the relay router, in which the data from the correspondent node is buffered in response to said performing control, is one of a plurality of relay routers connected in a hierarchical structure and is determined by the previous edge router as a relay router with a minimum hop count from the radio terminal unit and under which a plurality of candidate edge routers as potential destinations are connected.

20. The handover control method according to claim 19, wherein said performing control includes instructing the relay router to forward the data buffered in the relay router and a current address of the radio terminal unit to said current address.

21. The handover control method according to claim 20, wherein said performing control includes assigning the data an identifier of data on the occasion of forwarding the buffered data.

22. The handover control method according to claim 20, wherein said performing control includes conducting a negotiation about a buffer size of the data from the correspondent node in the relay router.

23. The handover control method according to claim 22, wherein said performing control includes deleting the data in chronological order from the oldest during an operation of buffering the data over the buffer size determined by the negotiation.

24. The handover control method according to claim 22, wherein said performing control includes deleting already-received data notified of by the radio terminal unit.

25. The handover control method according to claim 20, wherein said performing control includes, after the handover of the radio terminal unit, deleting already-received data having already been received before the handover by the radio terminal unit, from the data buffered in the relay router and forwarding data except for the already-received data to the radio terminal unit.

26. A system comprising:
an edge router provided configured to detect handover of a radio terminal unit and connected by radio communication to the radio terminal unit, said edge router including a retaining unit configured to retain location information about locations of an adjacent edge router and a plurality of relay routers connected to the adjacent edge router in a hierarchal structure, a determining unit configured to determine a relay router under which a previous edge router having been connected to the radio terminal unit and every edge router as a candidate for a destination of the movement are connected, based on the location information thus retained, and an instructing unit configured to instruct the relay router thus determined to buffer data from a correspondent node; and a relay router configured to buffer data from a correspondent node in accordance with an instruction to buffer data, given by the instructing unit of the edge router in accordance with a data forwarding instruction given by the instructing unit, buffer the data from the correspondent node, put with the buffered data a current address of the radio terminal unit and an identifier for identification of packet data, and forward the packet data to the current address of the radio terminal unit after the movement of the radio terminal unit and in accordance with the data forwarding instruction.

27. The radio terminal unit according to claim 8, further comprising:
a memory unit configured to memorize an address for identifying the radio terminal unit in a relay router during handover; and an instructing unit configured to, in order to change a forwarding address of packet data after the handover in the relay router from a previous address of the radio terminal unit to a current address of the radio terminal unit, instruct the relay router to forward packet data to the current address of the radio terminal unit.

* * * * *